Aug. 8, 1950     E. O. ROGGENSTEIN     2,518,377
POWER OPERATED DIFFERENTIAL MECHANISM
Filed May 16, 1947                                 7 Sheets-Sheet 1

INVENTOR
E.O. ROGGENSTEIN
BY Anthony Mantione
AGENT

Aug. 8, 1950 E. O. ROGGENSTEIN 2,518,377
POWER OPERATED DIFFERENTIAL MECHANISM
Filed May 16, 1947 7 Sheets-Sheet 2
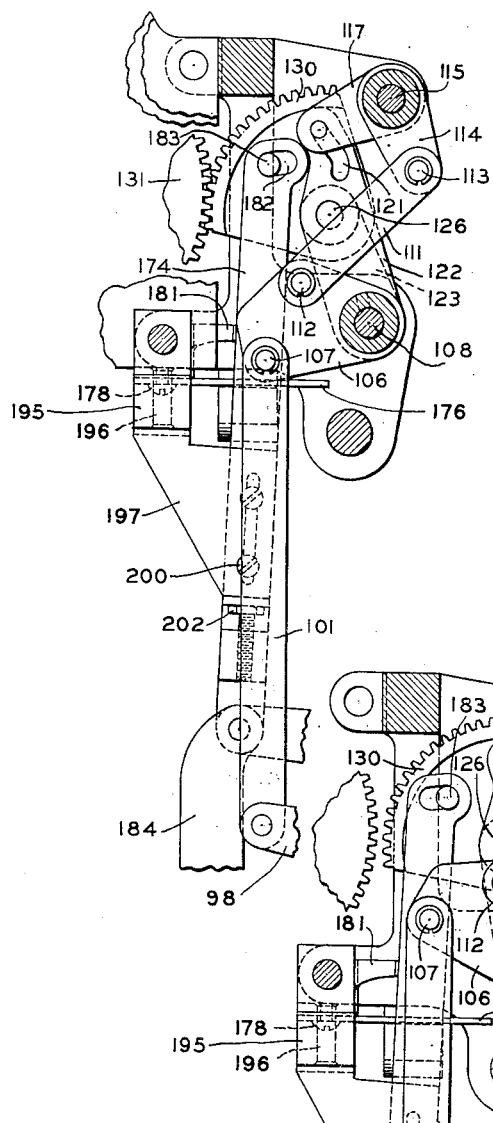
FIG. 2
FIG. 3
FIG. 4
INVENTOR
E.O. ROGGENSTEIN
BY 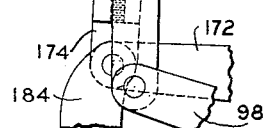
AGENT Aug. 8, 1950 E. O. ROGGENSTEIN 2,518,377
POWER OPERATED DIFFERENTIAL MECHANISM
Filed May 16, 1947 7 Sheets-Sheet 4

INVENTOR
E. O. ROGGENSTEIN
BY
Anthony Mantione
AGENT

Aug. 8, 1950 E. O. ROGGENSTEIN 2,518,377
POWER OPERATED DIFFERENTIAL MECHANISM
Filed May 16, 1947 7 Sheets-Sheet 5

INVENTOR
E.O. ROGGENSTEIN
BY
Anthony Mantione
AGENT

Aug. 8, 1950   E. O. ROGGENSTEIN   2,518,377
POWER OPERATED DIFFERENTIAL MECHANISM
Filed May 16, 1947   7 Sheets-Sheet 6

INVENTOR
E. O. ROGGENSTEIN
BY Anthony Muntean
AGENT

Aug. 8, 1950     E. O. ROGGENSTEIN     2,518,377
POWER OPERATED DIFFERENTIAL MECHANISM

Filed May 16, 1947     7 Sheets-Sheet 7

INVENTOR
E.O. ROGGENSTEIN
BY Anthony Mantione
AGENT

Patented Aug. 8, 1950

2,518,377

UNITED STATES PATENT OFFICE 2,518,377

POWER-OPERATED DIFFERENTIAL MECHANISM

Edwin Otto Roggenstein, Ilion, N. Y., assignor to Remington Rand Inc., Buffalo, N. Y., a corporation of Delaware Application May 16, 1947, Serial No. 748,467

16 Claims. (Cl. 235—59)

This invention relates to new and useful improvements in recording and computing machines and more particularly to accumulator actuator mechanisms of the type shown and described in my copending U. S. application S.N. 647,134 filed February 13, 1946, now Patent No. 2,489,724.

The above mentioned copending application discloses a planetary actuator drive mechanism which replaces the usual intricate and costly linkages including the conventional "sector gear" and "goose necks" shown and described in the U. S. patent to Wahl, 1,270,471, issued June 25, 1918. The planetary actuator includes an epicylic gear train which is in continuous driving connection with the usual master wheel so as to insure a proper entry into the accumulator upon each actuation of a numeral key. While the above planetary actuator constitutes a great advancement in the bookkeeping machine art, it has been found that the cost of manufacturing this unit is considerable due to the peculiar construction and arrangement of the epicyclic gear train. Also, due to the large amount of moving parts necessary for the proper functioning of this device, a "back lash" results when the add arm is in the down position, causing the register wheels to spiral. This condition is obviously undesirable as a wrong entry may result.

Therefore, the principal object of this invention is to simplify the structure of accumulator actuator mechanisms in a manner to reduce the number of parts necessary for the proper functioning of the device and for enabling a more accurate entry in the accumulator.

Another object of the invention is to insure against "back lash" and against spiralling of the register wheels.

Still another object of the invention is to insure a continuous driving connection between the actuator mechanism and the master wheel during the entire entry operation of the machine and to insure a definite break thereof during non-entry operations.

Another object of this invention is to insure a locking of the master wheel during non-entry operations and the unlocking of the master wheel during entry operations.

In carrying out the above objects, the present invention provides a single drive segment normally out of driving connection with the master wheel gear train and movable into driving connection with said train upon the start of entry operations and retained in said drive connection until the completion thereof. The drive segment is retained out of drive connection with the gear train from the time the entry operation is completed on through the return of said segment to its normal position in which the segment may again be brought into drive connection with the gear train for a subsequent entry. The invention also provides a locking pawl normally in locking engagement with the master wheel gear train during non-entry operations and movable out of locking engagement with the said gear train during entry operations.

Other objects and structural details of the present invention will be apparent from the following description when read in connection with the accompanying drawings in which:

Fig. 2 is a fragmentary right hand side view showing the drive segment in engaged position ready for any entry operation;

Fig. 3 is a view similar to Fig. 2 and showing the drive segment and its associated parts at the completion of a "5" entry operation;

Fig. 4 is a view similar to Fig. 2 showing the drive segment and its associated parts in the normal position;

The invention described herein is shown embodied in a power driven Remington recording and computing machine of the type shown and described in the above mentioned copending application, S. N. 647,134, now Patent No. 2,489,724. However, while the invention is herein embodied in the above type machine, it will be understood that the same may be used in connection with any type of recording and computing machine without departing from the scope of the invention. Only so much of the old machine is herein shown and described as is consistent with a clear understanding of the invention.

General description

As previously set forth the present invention is herein shown embodied in a power driven Remington type recording and computing machine. This machine includes a power driven cam unit which is effective upon operation of any numeral key to initiate operation of the adding and subtracting mechanism, the spacing mechanism, the master wheel locking and unlocking mechanism and the restoring mechanism.

Key operation of power shaft

Figure 1:
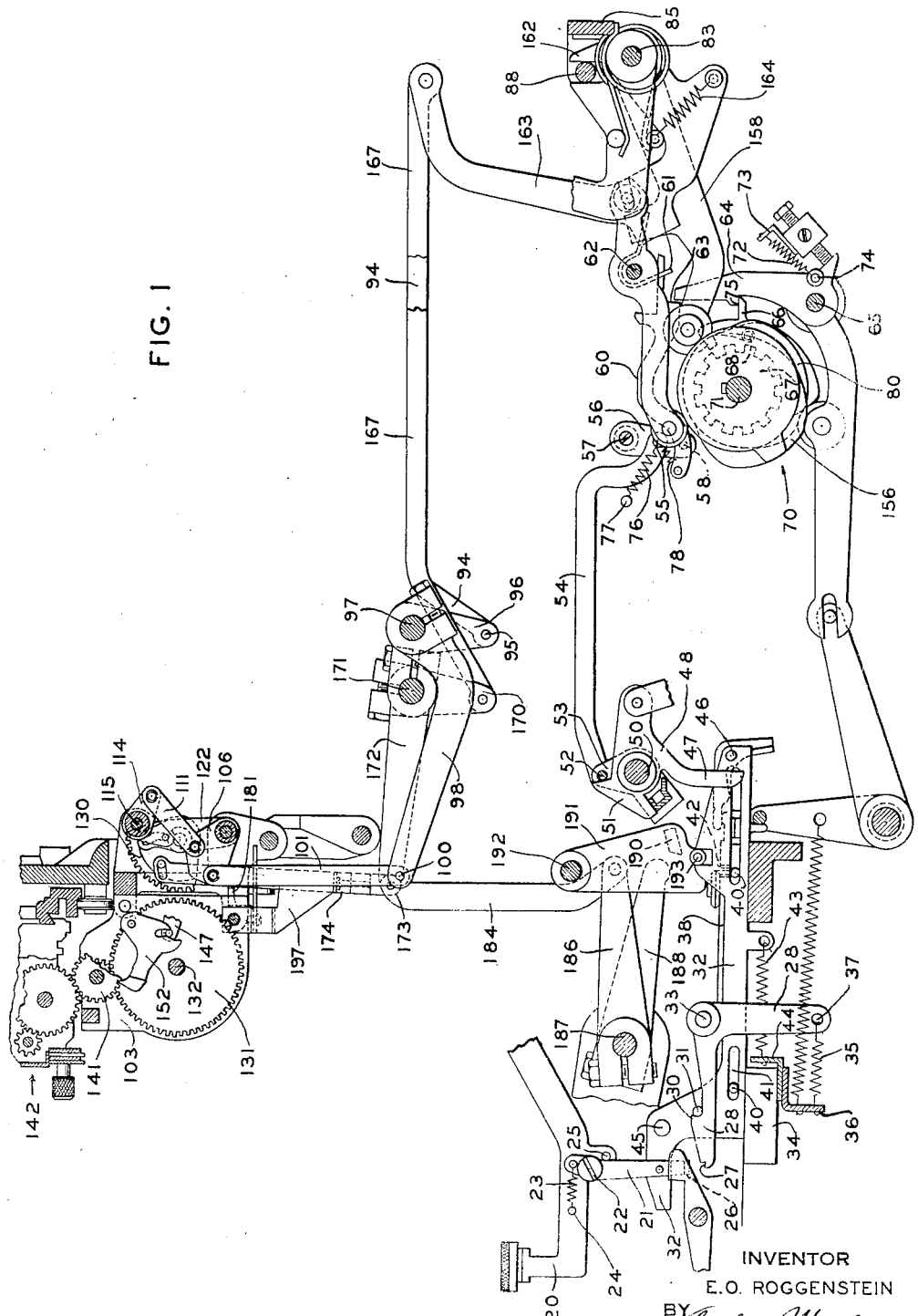
Fig. 1 is a partial front to rear vertical cross section of the machine embodying the present invention.

As is best seen in Fig. 1, each of the numeral key levers 20 are pivoted at their rear ends on the usual channel bracket and are provided at their forward ends with depending levers 21. The levers 21 are pivoted at 22 and are urged in the counter-clockwise direction by a spring 23, one end of which is connected to the lever 21 and the other end connected to a pin 24 on the numeral lever 20. A pin 25 on the lever 20 limits the counter-clockwise movement of its associated lever 21. The extreme lower portion of each of the levers 21 is provided with a bent over lug 26 which lies in the same vertical plane as a shoulder 27 formed on the forward end of an associated lever 28. Each lever 28 is formed with an additional shoulder 30 adapted to be engaged by a pin 31 mounted upon an associated slide 32 so as to limit the forward movement of said slide. The levers 28 are rotatably mounted in suitable space relation upon a cross shaft 33 mounted at its ends in a casting 34, secured to the inner sides of the left and right hand walls of the power base frame. Individual springs 35 having one end connected to a plate 36 secured to the casting 34 and the other end connected to pins 37 on the levers 28 serve to urge the levers in a clockwise direction. The slides 32 are guided for front to rear movement in slots 38 formed on the casting 34 and are limited in such front to rear movement by means of a pair of cross rods 40 which pass through elongated slots 41 in the slides 32. In order that the cross rods 40 may be held against any displacement, the rods fit into notches 42 formed in the comb portion of casting 34 and are clamped in said notches by means of suitable clamps secured to the upper portion of casting 34. Each of the slides 32 is resiliently urged forwardly by means of a spring 43 having one end connected to a plate 44 secured to the casting 34 and the other end connected to the slide 32. The above construction is such that upon depression of a numeral key 20, the bent over portion 26 of its associated lever 21 engages the shoulder 27 of its associated lever 28 to rock said lever about its pivot 33 against the tension of spring 35. When the lever 28 is thus rocked, its shoulder 30 moves out of the path of the pin 31 of its associated slide 32 to permit the said slide to move forwardly due to the tension of its spring 43. The above slides 32 are adapted to move forwardly to their effective position and rearwardly to their restored position once for each cycle of the machine to control the various machine functions.

In order to effect an immediate full restoration of the lever 28 so as to be in position to latch its associated slide 32 when said slide is restored to its normal rearward position, the forward end of the slide is provided with a pin 45 which is adapted to engage and move its associated lever 21 in the clockwise direction against the tension of its spring 23, out of the path of shoulder 27. This action takes place at about the time the numeral lever 20 is in its full depressed position. It will be seen from the above that the key lever 20 may be retained in its lowered position a length of time somewhat beyond that which is necessary to release its associated lever 28 to be restored to its latching position.

In order to effect the rotation of the cam unit, to perform the various functions of the machine, the rearward end of each of the slides 32 is provided with a stud 46 which, when the slide moves forward as above described, engages a depending arm 47 of a four-arm lever 48 loosely mounted on a cross shaft 50 journaled at its ends in brackets secured to the inner sides of the left and right hand walls of the power base frame.

The lever 48 is provided with an arm 51 which, when the lever 48 is rocked, engages a bail rod 52 supported at its ends by arms 53 (one shown) loosely mounted upon the shaft 50. Suitably connected at its forward end to the bail rod 52 is a rearwardly extending link 54 the rear-end of which is connected at 55 to a depending arm 56 pivotally mounted upon a stub shaft 57 secured to the left hand wall of the frame. Connected at 58 to the depending arm 56 is a lever 60, one arm of which extends rearwardly and is supported and guided for sliding movement in a slot formed in a comb plate 61 which plate is rigidly supported upon a cross shaft 62 suitably mounted in the left and right hand frame walls of the typewriter frame. The lever 60 is provided with a shoulder 63 adapted when the lever 60 is moved rearwardly to engage the upper end of a latch member 64 and rock said member about its pivot 65. The said pivot 65 is secured to a forwardly extending bracket secured to the rear wall of the power base frame. A clutch dog 66 is resiliently urged in the counter-clockwise direction in the usual manner to engage with a tooth on a clutch member 67 and is pivoted upon a stud 68 suitably secured to a cam unit 70 (see Fig. 1) loosely mounted upon a continuously rotating power shaft 71. A spring 72 having one end connected to a bracket 73 and the other end connected to a pin 74 on the latch member 64 serves to urge the said latch member 64 in the counter-clockwise direction.

From the above it will be seen that normally the latch member 64 through its shoulder 75 retains the clutch dog 66 out of engagement with the teeth on the clutch member 67, thereby disconnecting the cam unit 70 from the continuously rotating shaft 71. Upon depression of a numeral key, the link 60 is moved rearwardly as above described to disengage the latch member 64 from the clutch dog 66, whereby the clutch dog moves into engagement with a tooth on the clutch member 67 to connect the cam unit 70 with the continuously rotating shaft 71.

Near the end of the cycle of operation, the link 60 is brought forward to its normal position whereby the latch member 64 through its spring 72 is rocked to its counter-clockwise position in the path of the clutch dog 66 to disengage the clutch member 67. A spring 76 having one end connected to the arm 56 and the other end connected to a cross shaft 77 serves to restore the arm 56 and its associated linkage to their forward normal position. A spring 78 having one end connected to the arm 56 and the other end connected to the forward arm of lever 60 serves to urge the rearward end of said lever downwardly into operating relationship with the upper portion of the latch member 64.

Cam unit

The above mentioned cam unit 70 comprises four cams to initiate various operations of the machine. In my copending application Serial No. 647,134, now Patent No. 2,489,724, disclosing the planetary drive actuator, one of these cams was utilized for unlocking and relocking a master wheel in coordination with the locking and unlocking of a "locking gear." The said locking gear controlled the rotation of a "sun gear" shaft. This combined locking mechanism was for the purpose of freeing the master wheel for rotation, and simultaneously for locking the sun gear shaft around which the planetary gears were rotatable. Another cam of the unit 70 was utilized for initiating the revolving motion of the ring gear around the said sun gear in order to transmit the respective motion to the master wheel shaft and thereby to the totalizer. Of the two other cams comprising the unit 70, one was employed for initiating the usual carriage escapement mechanism and the other for initiating restoring operations. The restoring operation of course results in replacing all mechanisms in their normal positions thereby preparing the machine for the next cycle of operation. The last two mentioned cams do not have any bearing on this invention but were briefly described to give an over all picture of the functions of the cam unit in relationship to the machine in general.

In the present invention, the two first above mentioned cams of the unit 70 are utilized to initiate the actuation of a novel mechanism which herein replaces the planetary drive actuator for controlling entries into the totalizer. The first above mentioned cam in addition to controlling the locking and unlocking of the master wheel, also controls the bodily movement of a sector gear whose function will presently be described. According to this invention this cam will be called the sector-engaging cam.

Sector-engaging cam

Figure 8:
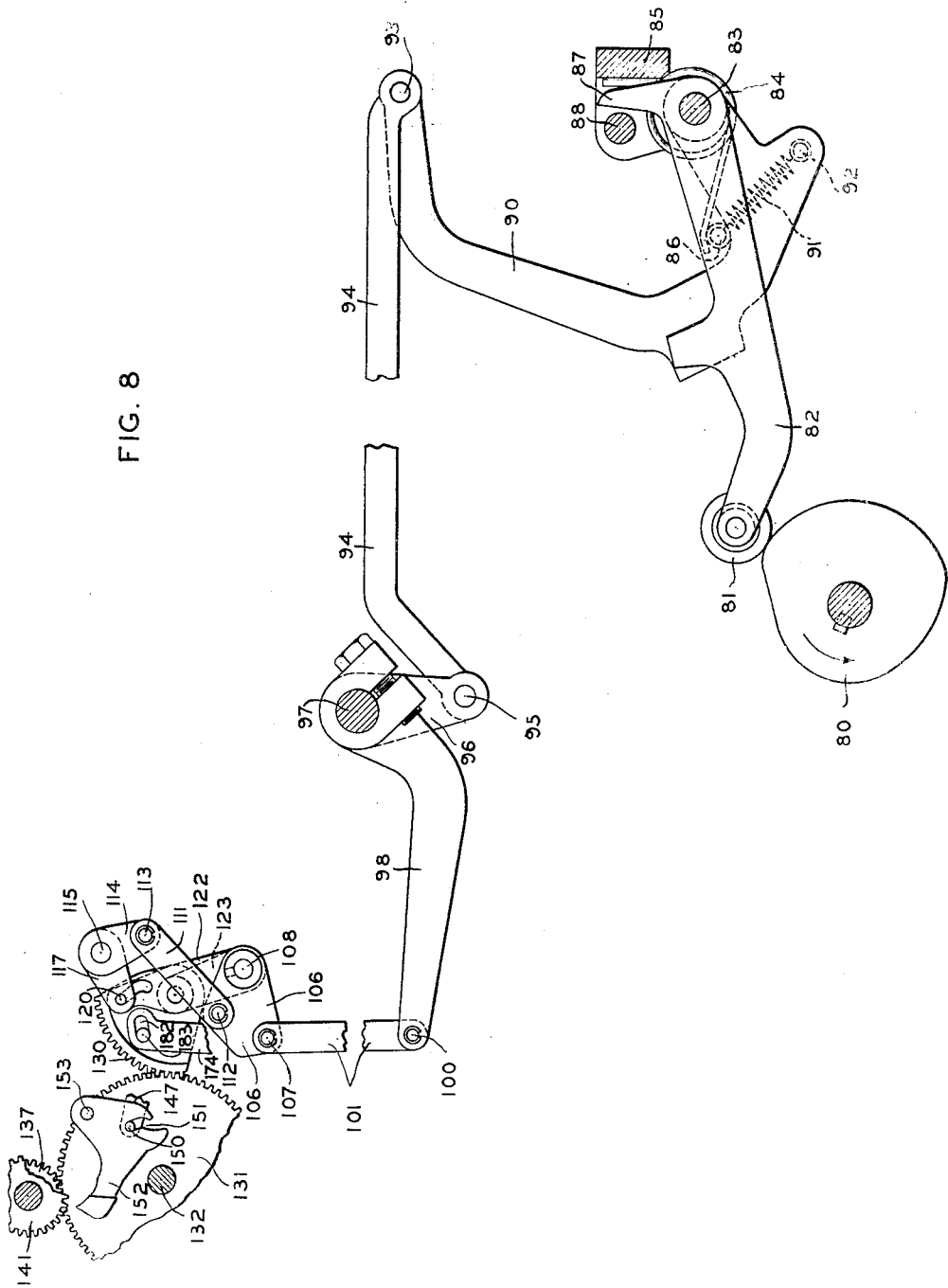
Fig. 8 is a partial right hand sectional view of the actuator mechanism showing the drive segment in engaged position and its associated mechanism in operated position.
Figure 9:
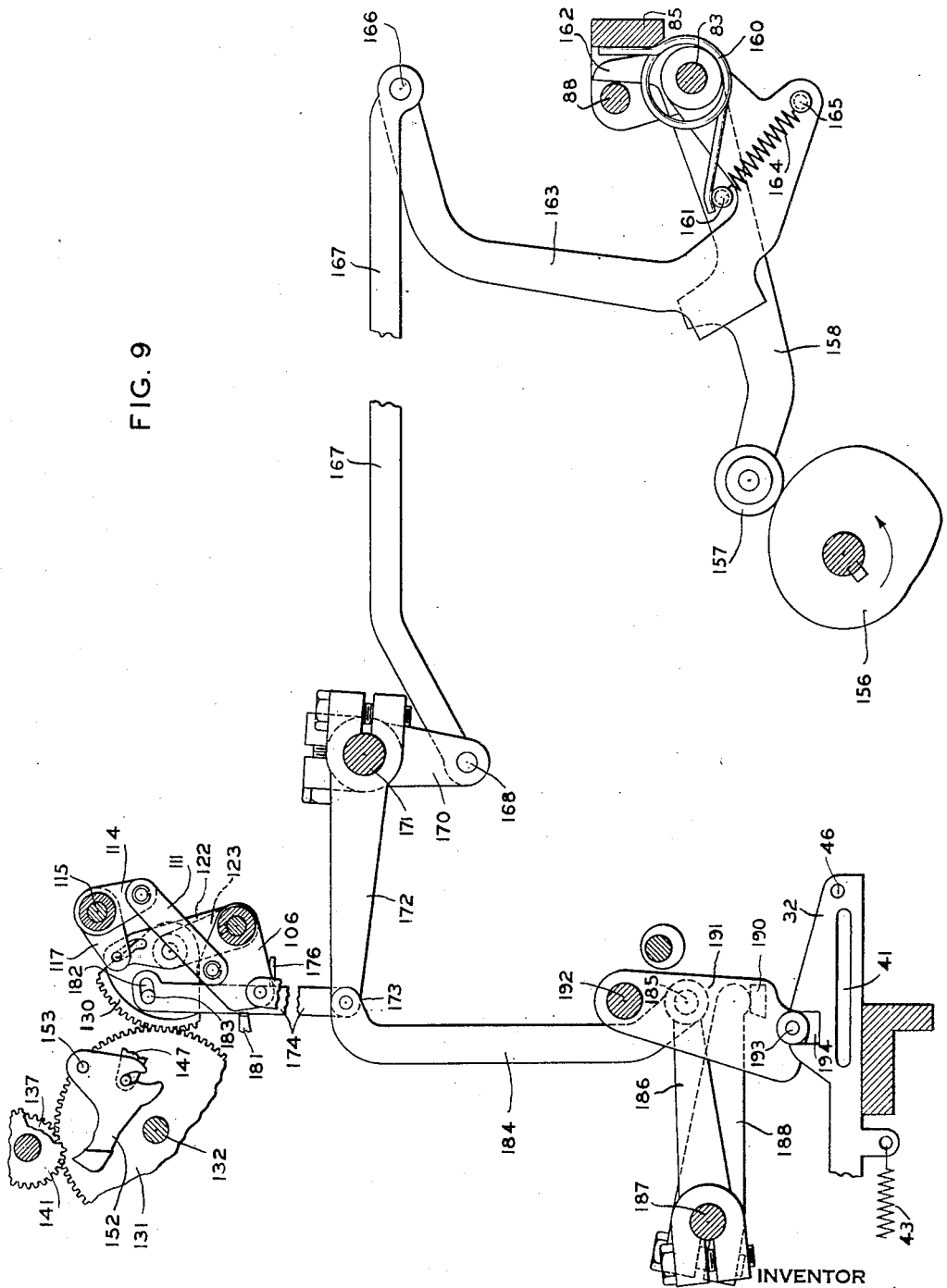
Fig. 9 is a view similar to Fig. 8 but showing the drive segment and its associated mechanism at the completion of a "5" entry operation.

By referring to Figs. 1 and 8 it will be seen that this mechanism includes the said sector-engaging cam 80 and a roller 81 adapted to ride on the periphery of said cam. The roller 81 is mounted for rotation upon the forward end of an arm 82 pivoted upon a shaft 83. The arm 82 is resiliently urged in the counter-clockwise direction by means of a spring 84 having one end bearing against the inner side of a bracket 85 and the other end bearing against a pin 86 fixed to the arm 82. An upwardly extending toe 87 formed on the arm 82 is adapted to cooperate with a cross bar 88 in a manner to limit the counter-clockwise movement of said arm 82. Pivotally mounted upon the shaft 83 is a U shaped arm 90 which is resiliently connected to the arm 82 by means of a spring 91 having one end connected to a pin 92 on the arm 90 and the other end connected to the pin 86. The U shaped arm 90 extends upwardly and is connected at 93 to a forwardly extending link 94 which link is connected at 95 to a depending arm 96 fast on a cross shaft 97. The cross shaft 97 is journaled at its ends in left and right hand brackets secured to the outer sides of the left and right hand walls of the frame and has secured thereon a forwardly extending arm 98. The arm 98 is connected at 100 to the lower end of a vertical link 101. To this point, the above mechanism is similar to that disclosed in my copending application Serial No. 647,134, now Patent No. 2,489,724, for actuating the aforementioned locking mechanism. It will be seen at this point that upon rotation of the cam unit, 70 the sector engaging cam 80 (Fig. 8) will raise the follower 82 thereby rotating it in the clockwise direction about the shaft 83. Due to the tension placed on the spring 91 from this movement, the U shaped arm 90 will also be moved in the same direction. The link 94 will thereby be moved rearwardly thus rotating the arms 96 and 98 in the counter clockwise direction. This will of course result in the lowering of the link 101.

Sector engaging mechanism

Figure 5:
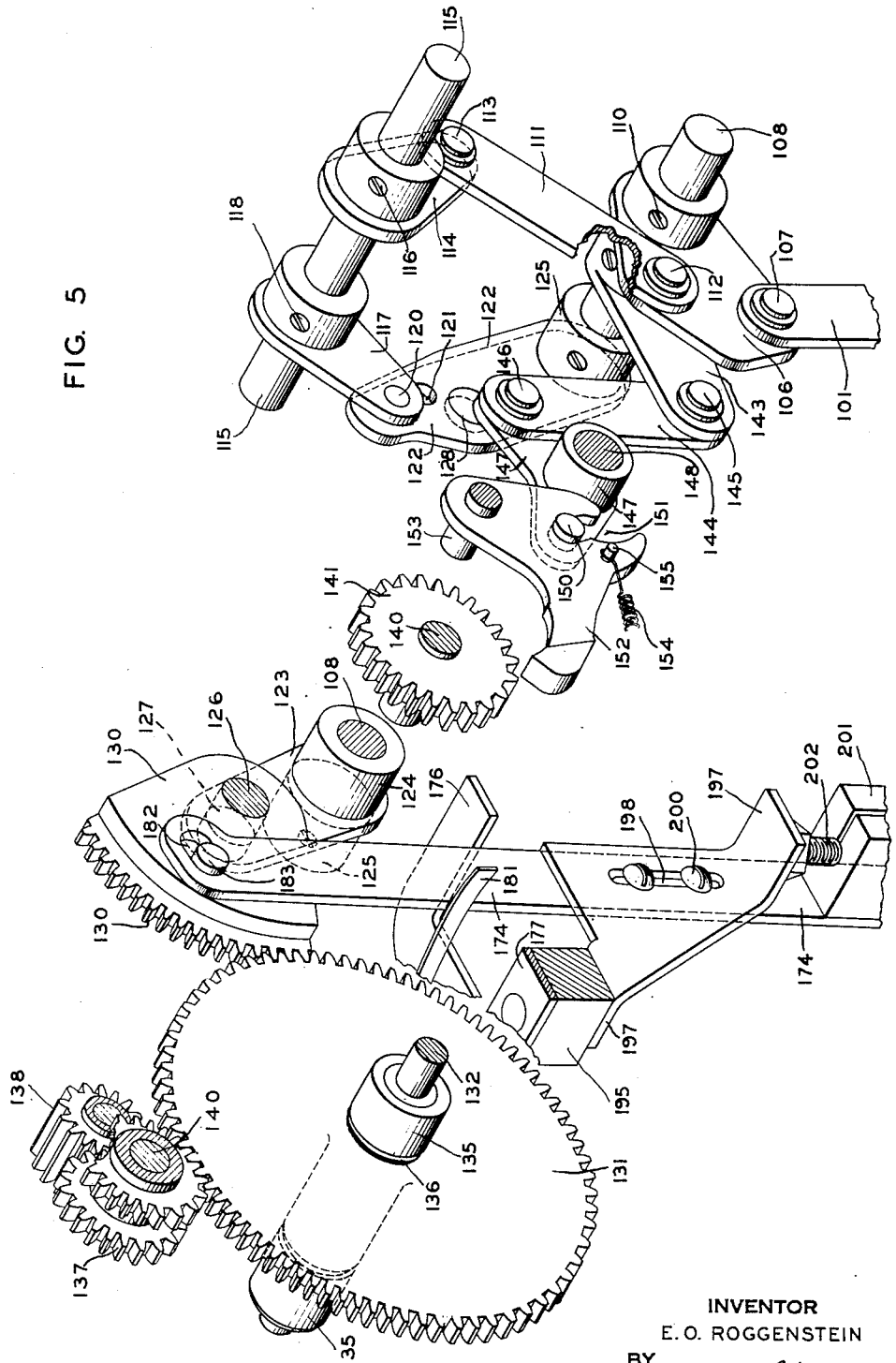
Fig. 5 is an exploded isometric view of the mechanism in the same position as shown in Fig. 2.
Figure 6:
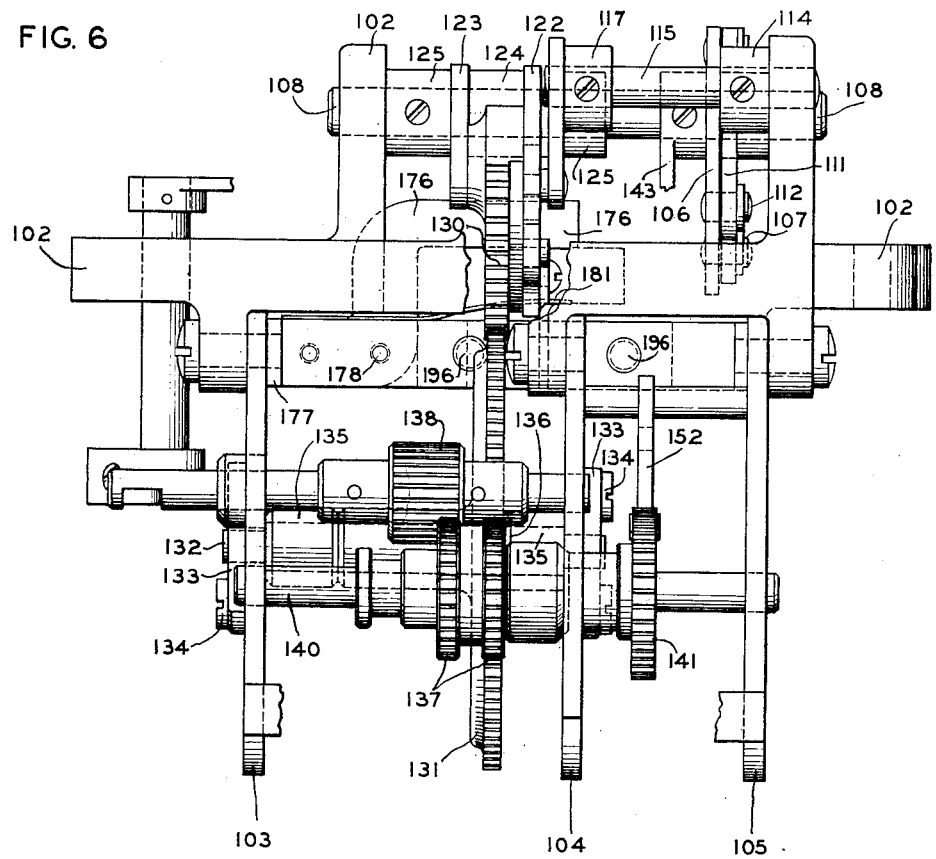
Fig. 6 is a partial top plan view of the actuator mechanism in the position as shown in Fig. 2.
Figure 7:
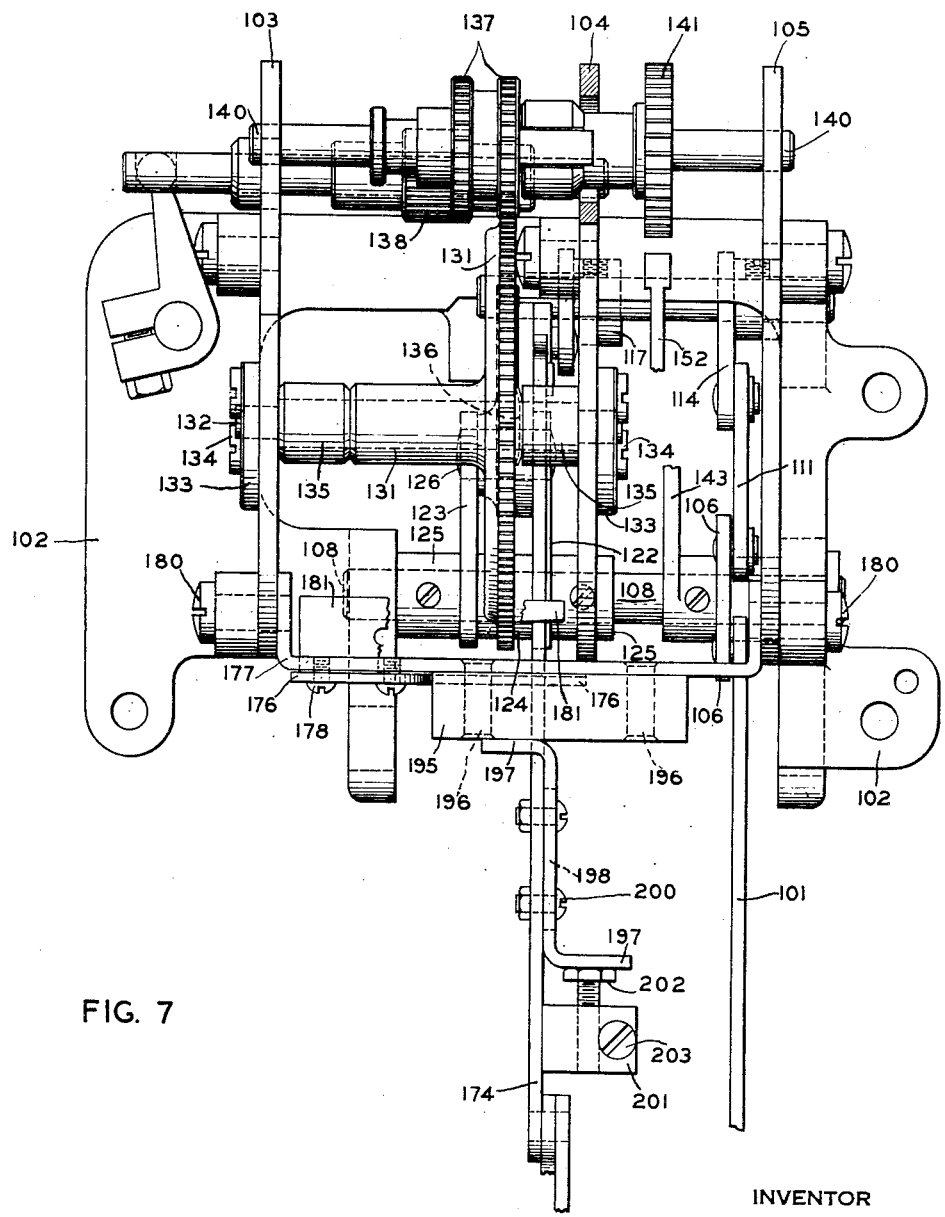
Fig. 7 is a partial front elevational view of the actuator mechanism.

According to the present invention it will be seen by reference to Figs. 1, 6 and 7 that a sector is employed for rotating an actuator gear which transmits the respective motion to the usual master wheel and totalizer. The said sector is capable of being moved bodily into and out of engagement with the said actuator gear. It is also capable of being rotated either when in engagement or out of engagement with the said actuator gear. The new actuator mechanism is embodied in framework comprising a main casting 102 and three vertical frame plates 103, 104 and 105. It will further be seen by particular reference to Figs. 2, 3, 4 and 5 that the forward end of an arm 106 is pivoted to the aforementioned link 101 by means of a stud 107. The other end of the arm 106 is rigidly connected to a rock shaft 108 by means of a screw 110. The rock shaft 108 (Fig. 6) is journaled at its ends in the casting 102. A link 111 (Fig. 5) is pivoted at one end to the upper center portion of the arm 106 by means of a stud 112. The other end of the link 111 is pivoted at 113 to an arm 114 which is rigidly mounted on a shaft 115 by means of a screw 116. By referring to Fig. 6 it will be seen that the said shaft 115 is journaled at its ends in the casting 102. Returning now to Fig. 5 it will be seen that an arm 117 is also rigidly mounted on the shaft 115 by means of a screw 118. The said arm 117 has at its end a stud 120 which extends through a cam slot 121 formed in an arm 122 loosely mounted on the rock shaft 108. An arm 123 associated with the arm 122 is also loosely mounted on the rock-shaft 108 and extends upwardly parallel (Fig. 7) to the said arm. Referring to Figs. 5, 6 and 7 it will be seen that a spacer 124 is loosely mounted on the shaft 108 between the arms 122 and 123 to keep them sufficiently spaced. It will also be seen that a collar 125 is rigidly mounted on the rock shaft 108 at the outer side of each of the said arms 122 and 123 to hold them in their proper spaced positions on the said shaft. It will be seen by reference to Fig. 5 that a stud shaft 126 extends through holes 127 and 128 in the arms 122 and 123 and is riveted at its ends to the said arms.

A sector gear 130 is rotatably mounted upon the stud shaft 126. The function of the said sector gear 130 will be described in the chapter headed "Computing mechanism." The mechanism thus far described is operable in the following manner. The cam cycle as has been previously described is initiated upon depression of a numeral key 20. Upon rotation of the cam unit 70 the sector engaging cam 80 becomes effective immediately and at approximately sixty degrees (60°) results in the full lowering of the link 101. It will be seen that the lowering of the said link results in the counter-clockwise rotation of the arm 106 which in turn pulls the link 111 to rotate the arms 114 and 117 in the clockwise direction with the shaft 115. This rotation results in the camming of the arm 122 in the counter-clockwise direction about the rock shaft 108 by means of the stud 120 attached to the arm 117. As described above, the stud 126 is riveted to the arm 122, extends through the sector gear 130 and is riveted at its other end to the arm 123. It will be seen then, that upon the movement of the arm 122 in the counter-clockwise direction about the rock-shaft 108 that the arm 123 and the said sector gear 130 will also be moved in the same general direction. The said sector gear 130 as shown in Figs. 2, 5, 6, 7, 8 and 9, upon the above movement becomes engaged with an actuator 131, which, as is best shown in Figs. 5, 6, and 7 is rotatably mounted on a shaft 132 secured at its ends in the left and center actuator frame plates 103 and 104. Accessory frame plates 133 (Figs. 6 and 7) are fastened to the outer side of each of the said actuator frame plates 103 and 104 by screws 134 to doubly secure the shaft 132. A spacer 135 is loosely mounted on the shaft 132 to take up the slack on the said shaft between the left hand side of the actuator gear 131 and the actuator frame plate 103. A similar spacer 135 is also loosely mounted on the shaft 132 to take up the slack on the said shaft between the right hand side of the actuator gear 131 and the center frame plate 104. It will be seen by reference to Figs. 5 and 7 that, between the right hand side of the actuator gear 131 and the spacer 135, a friction disc 136 is compressed so as to have a slight holding effect upon the said actuator gear. The friction disc 136 is for the purpose of doubly assuring that the actuator gear 131 will not rotate of its own accord during the sector engaging and disengaging operations. The actuator gear 131 meshes with either one of two gears 137 or 138, whichever one is shifted into the position to engage it. This gear shift is disclosed in the aforementioned U. S. patent to Wahl 1,270,471 and is well known in the art, therefore, a brief description will suffice. As is best shown in Figs. 5, 6 and 7, the gear 137 is slidably mounted on, but capable of rotating a master wheel shaft 140 and thereby a master wheel 141. As is well known in the art, the master wheel 141 engages successively step by step with the carry wheels of a totalizer 142, such as is shown in Fig. 1, as the totalizer is moved by the carriage across the said master wheel. The gears 137 and 138 are set by a reversing mechanism for addition or subtraction. When the gear 137 is in mesh with the actuator gear 131 (Fig. 5), it rotates in the add direction and has direct effect upon the master wheel shaft 140 in the add direction. However, by reversing the gear shift 137—138, the gear 137 is slid out of engagement with the actuator gear 131 and the gear 138 is now moved into engagement with the said gear. The other end of the gear 138 however is still in mesh with one side of the gear 137. It is through the gear 138 that the motion is now transferred through the gear 137 to the master wheel shaft 140 and thus the master wheel 141 in the subtract direction.

*Master wheel pawl mechanism*

In order to assure the locking of the master wheel while no computation is taking place, and in order to unlock the said master wheel during a computing operation, a pawl mechanism is employed. This mechanism operates in harmony with the sector-engaging mechanism described above. By reference to Figs. 5, 6 and 7, it will be seen that this mechanism includes an arm 143 rigidly mounted on the rock-shaft 108 and extending forwardly. One end of a link 144 is pivoted at 145 to the arm 143, and at its other end is pivoted at 146 to a bell-crank 147 which is rotatably mounted on a shaft 148. The said shaft 148 is secured at its ends in the center and right hand and center frame plates 104 and 105. A pin 150 extending from the far end of the bell crank 147 rides in a cam slot 151 of a master wheel pawl 152. The said pawl 152 is rotatably mounted on a shaft 153 which is secured at its ends in the center and right hand actuator frame plates 104 and 105, and serves the purpose of locking or unlocking the aforementioned master wheel 141. A spring 154 attached at one end to a pin 155 on the pawl 152 and at its other end to a pin extending from the frame plate 104 tensions the pawl in the clockwise direction so as to always urge the said pawl towards its locking position. As previously explained, upon rotation of the cam 80 the sector-engaging link 101 is moved first in the downward direction which results in the counter-clockwise rotation of the rock shaft 108. This rotation will cause the arm 143 to rotate in the counter-clockwise direction and the said rotation will cause the link 144 to be lowered accordingly. It will be seen at this point that the lowering of the link 144 will result in the clockwise rotation of the bell-crank 147, and that the pin 150 of the said bell-crank will rise in the cam slot 151 of the master wheel pawl 152. The camming of the pawl 152 by the pin 150 will effect the counter-clockwise rotation of the said pawl to unlock the master wheel 141 and thereby free it for rotation. As the sector-engaging cam 80 progresses in its cycle, the link 101 will be raised to its normal position in which event the linkage just mentioned will move entirely in opposite directions. This movement will effect the locking of the master wheel 141 by the pawl 152. The pin 150 will of course now be lowered in the slot 151 and the spring 154 will tension the said pawl 152 into locking engagement with the said master wheel 141. It should be clear at this point that the movement of the master wheel pawl 152 is synchronized with the movement of the sector gear 130 through motion initiated by the link 101. The arrangement is such, that immediately after the sector gear 130 is moved into engagement with the actuator gear 131 by the pulling down of the link 101 that the master wheel pawl 152 will unlock the master wheel 141. When the sector gear 130 is about to be disengaged by the upward movement of the link 101, the master wheel pawl 152 will lock the master wheel 141 immediately prior to the said disengaging.

*Computing mechanism*

As previously explained, the cam 80 of the cam unit 70 is employed for the purpose of engaging the sector gear 130 with the actuator gear 131. It is also employed for operating the master wheel pawl 152 in coordination with the operation of the said sector gear. In order to provide means for effecting the entry of amounts into the accumulator, the operation of the sector gear 130 is under the control of an add cam 156 (Fig. 9) of the cam unit 70. It will be seen by reference to Figs. 1 and 9 that the mechanism for this purpose includes the said add cam 156 and a roller 157 adapted to ride upon the periphery of the said cam. The roller 157 is rotatably mounted upon an arm 158 pivotally mounted upon the shaft 83. The arm 158 is resiliently urged in the counter-clockwise direction by means of a spring 160 one end of which bears against the bracket 85 and the other end of which bears against a pin 161 fixed to the arm 158. An upwardly extending toe 162 formed on the arm 158 cooperates with the cross bar 88 in a manner to limit the counter-clockwise rotation of the said arm. Pivotally mounted upon the shaft 83 is a U shaped arm 163 which is resiliently connected to the arm 158 by means of a spring 164. One end of the said spring 164 is connected to the pin 161 on the arm 158 and the other end is connected to a pin 165 on the arm 163. The upper end of the arm 163 is connected at 166 to the rear end of a link 167 the forward end of which is connected at 168 to a depending arm 170 secured to a cross shaft 171. The cross shaft 171 is journaled at its ends in brackets and has secured thereto a forwardly extending arm 172 pivotally connected at 173 to an upwardly extending add link 174. It will be seen that to the rear of the add link 174 a limit bar 176 is mounted upon a frame bracket 177 (Figs. 5 and 7) by screws 178. The said frame bracket 177 is secured at its ends to the lower inner sides of the frame plates 103 and 105 by screws 180 which also extend through the casting 102. The said limit bar 176 limits the rearward movement of the add link 174. A flat spring 181 in the form of a bracket is fastened upon the frame bracket 177, and tends to urge the link 174 in the clockwise direction toward the said limit bar 176. The function of the springs 181 will be described later under the heading of "Operation." The upper end of the add link 174 has a horizontal elongated slot 182 in which a pin 183 extending from the sector gear 130 rides in during the sector engaging and disengaging operations. It will be seen that as the sector gear 130 is moved into its engaged position that the pin 183 will move in a substantially horizontal line in the slot 182 of the add link 174. This will assure the proper engaging of the said sector gear 130 with the actuator gear 131. The above construction is such that upon the rotation of the add cam 156 (Fig. 9) the arm 158 will first be raised by the said cam and will result in the clockwise rotation of the U shaped arm 163. The arm 163 will in turn pull the link 167 rearwardly to initiate the counter-clockwise rotation of the arm 170, the shaft 171, and the arm 172. This rotation will result in the lowering of the link 174. As will be more particularly described, the movement of the add link 174 effects the entering of amounts into the accumulator. In order to limit the downward movement of the link 174 so that an amount may be entered into the accumulator corresponding to the particular key depressed, the lower end of the link 174 is connected at 173 to another link 184 which in turn is connected at 185 to an arm 186 suitably secured to a cross shaft 187. The cross shaft 187 is journaled at its ends in left and right hand brackets secured to the inner sides of the left and right hand walls of the typewriter frame and has securely mounted thereon a plurality of differential arms 188, ten in number, corresponding to the ten numeral keys 29. The rearward end of each of these arms 188 is adapted to cooperate with an associated stop block 190 securely supported between a pair of depending arms 191 integral with each other and pivotally supported upon a cross shaft 192. The lower ends of one of each pair of the depending arms 191 is provided with a stud 193 adapted to engage a slot 194 formed in its associated slide 32. The above construction is such, that upon operation of a numeral key 29 its associated slide 32 moves forward, as previously described, to rock its corresponding pair of depending arms 191 in a clockwise direction about the shaft 192 thereby bringing the stop back 190 thereon directly beneath and in vertical alignment with its associated differential arm 188. When, during the beginning of a machine cycle, the links 174 and 184 are moved downwardly, the shaft 187 is rocked clockwise to move all of the differential arms 188 downwardly, until one of these arms limits against its corresponding stop block 190. This downward movement of the above linkage will also cause a counter clockwise rotation of the sector gear 130 thereby rotating the actuator gear 131. As previously described, the said actuator gear transmits the said rotation to either one of the gears 137 or 138 whichever happens to be in engagement with it, and the said rotation will correspond to the distance travelled by the limited differential arm 188. It will be recalled that upon the engaging of the sector gear 130 with the actuator gear 131 that the master wheel 141 was immediately unlocked thereby permitting its rotation by one of the said gears 137 or 138 and thus being capable of transmitting the previous mentioned rotation to the totalizer 142 (Fig. 1). It will be seen that upon further rotation of the add cam 156, the links 174 and 184 must be restored to their normal raised positions. This, however, is accomplished in a novel manner and can best be described during an example of operation of the machine which will be given under the title of "Operation."

*Add link adjustment*

The add link 174 as above described is for the purpose of rotating the sector gear 130 in order to effect the entering of amounts in the totalizer, and also for rotating the said sector gear to its normal clockwise position. In order that the sector gear 130 may always be properly engaged with the actuator gear 131, the following adjusting mechanism is employed. By reference to Fig. 7 it will be seen that a block 195 is secured to the previously mentioned bracket 177 by means of rivets 196. Referring now to the add link 174 it will be seen that an adjustable stop 197 having a vertical elongated slot 198 is fastened to the said add link 174 by means of screws 200. A suitable distance below the adjustable stop 197 a bracket 201 is secured to the add link 174. The said bracket 201 has an adjusting screw 202 which may be raised or lowered by rotating, and the said screw after being properly adjusted may be held firmly in its position by a locking screw 203. The above arrangement is such that when the add link 174 is in its normal position as shown in Fig. 7, the top of the bracket 197 will be held firmly against the bottom of the block 195. This is done in order to insure the holding of the sector gear 130 in the plane of the teeth of the actuator gear 131, so that when the said sector gear 130 is moved into engagement with the said actuator gear 131 the teeth of both will mesh perfectly.

*Operation*

Figure 10:
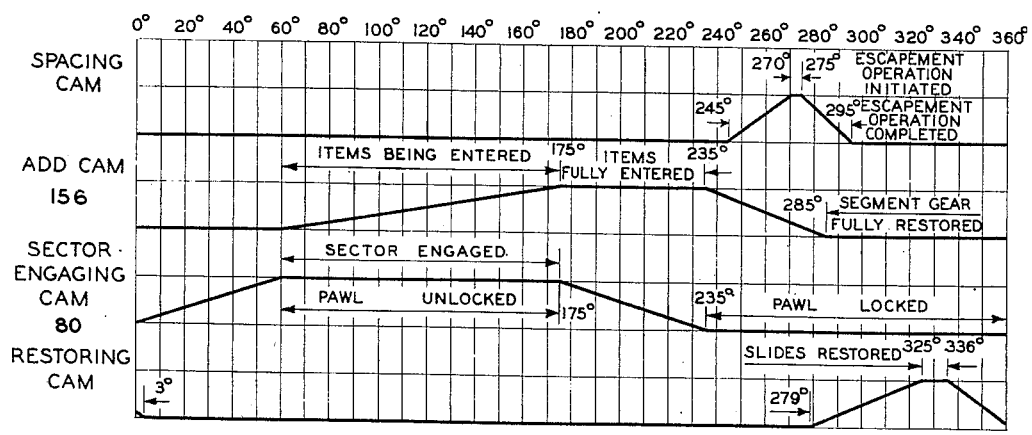
Fig. 10 is a timing chart.

Having described the invention in detail it is now believed that a description of an example of operation of the machine is in order. From the foregoing it will be clear that upon depression of a numeral key 20 (Fig. 1) the corresponding slide 32 will be released by the lever 28 and will spring forward thereby carrying with it the corresponding swinging plates 191 (Fig. 9) and a stop block 190. It will also effect the engaging of the cam unit 70 (Fig. 1) with the power shaft 71 by rotating the latch member 64 out of engagement with the clutch dog 66 by means of the lever 48, the link 54, and the lever 60. By reference to the cam chart (Fig. 10) it will be seen that as the cam unit 70 begins its cycle, the sector engaging cam 80 will become operable from 1° to 60° to effect the engaging of the sector gear 130 (Fig. 5) with the actuator gear 131 and the unlocking of the master wheel pawl 152. The said pawl thus frees the actuator gear 131 for rotation, there being a driving connection from the master wheel 141 through the gear shift 137—138 to the said actuator gear. At this point of operation (60°), the add cam 156 (Fig. 9) begins to effect the lowering of the link 174 and the said link is able to be lowered until the cam 156 has rotated to a position of 175° thereby insuring sufficient time for a complete entry to be transmitted to the master wheel 141. As the add link 174 is being lowered, the counter-clockwise rotation of the pin 183, of the sector gear 130, causes the said add link to move away from the limit bar 176. It is in this condition that the aforementioned spring 181 tensions the add link 174 towards the limit bar 176 in order to hold the left side of the slot 182, of the said add-link, against the left side of the pin 183 of the sector gear 130. This arrangement prevents the add-link 174 from floating back and forth during the lowering or raising of the said link and thereby insures a positive connection between the said sector gear 130 and the add link 174. It will be seen by reference to Figs. 1 and 9 that when the link 184 has, through the arms 186 and 188, been limited in its downward movement by a stop block 190 that the correct amount has already been transmitted to the master wheel. The add cam 156 holds the links 174 and 184 in their fully depressed positions against a stop block 190 from 175° to 235° rotation of the said cam. During the said rotation the sector gear 130 is also held firmly in its full counter-clockwise position thereby assuring that the actuator gear 131 and the master wheel 141 will also be firmly held against rotation. It should now be clear that when the correct amount is entered into the totalizer, the mechanism is held in that position so that the gears of the said totalizer can not be moved. This, of course, will insure an accurate entry. At the time that the sector gear 130 is held firmly in this depressed position (175°-235°), the sector engaging cam 80 will again become effective to restore the link 101 to its normal raised position. It should be remembered at this point that the friction disc 136 also tends to hold the actuator gear 131 against rotation. The raising of the said link 101 will effect first the locking of the master wheel 141 by the pawl 152 which will thereby also lock the actuator gear 131 against rotation. The raising of the said link 101 will next effect the disengaging of the sector gear 130 from the actuator gear 131. The said disengaging is accomplished in a substantially planar movement (Figs. 2, 3 and 4) due to the slot 182 in the add link 174 guiding the pin 183 of the sector gear 130. It will be noted that the engagement of the sector gear is similarly accomplished in a substantially planar movement. At this point, which is approximately 235°, the add cam 156 becomes operable to restore the link 174 to its normally raised position. This movement will also result in the clockwise rotation of the sector gear 130 to its normal position. This operation is completed at 285° rotation of the add cam 156, and the actuator mechanism is thus completely ready for another cycle of operation. It will be seen by reference to the cam chart (Fig. 10) that this complete actuation is performed in a comparatively short period of the complete cycle. This being the case, the balance of the cycle allows sufficient rotation of the cam unit 70 for completing various other operations of the machine such as carriage escapement and the restoring of the slides 32 and all other associated mechanism.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a recording and computing machine, a totalizer for receiving entries, numeral keys, a master wheel, an actuator gear in continuous driving connection with said master wheel, a sector gear permanently in the plane of rotation of said actuator gear, a continuously rotating power shaft, a cam unit normally disconnected from but associated with the power shaft, connections extending respectively between one of the cams in the unit and the sector gear for effecting engagement and disengagement of said sector gear with said actuator gear and between another of the cams in the unit and the sector gear for effecting rotation of said sector gear, and means actuated by the operation of any of said numeral keys to connect the cam unit with the power shaft.

2. In a recording and computing machine, numeral keys, a master wheel, a continuously rotating power shaft, an actuator gear normally in continuous driving connection with said master wheel, a sector gear permanently in the plane of rotation of said actuator gear, said sector gear being normally out of mesh with said actuator gear, a cam unit normally disconnected from but associated with the power shaft, a pawl for locking and unlocking the master wheel, connections extending respectively between one of the cams in the unit and the pawl and sector gear and between another of the cams in the unit and the sector gear, the connections adapted to engage the pawl with the master wheel when the sector gear is disengaged and vice versa as well as to drive the sector gear, and means actuated by the operation of any of the numeral keys to connect the cam unit with the power shaft.

3. In a recording and computing machine, a totalizer for receiving entries, numeral keys, a continuous rotating power shaft, a master wheel, an actuator gear normally in continuous driving connection with said master wheel, a sector gear permanently in the plane of rotation of said actuator gear, said sector gear being normally out of mesh with said actuator gear, a cam unit normally disconnected from but associated with the power shaft, a pawl for locking and unlocking the master wheel, connections extending respectively between one of the cams in the unit and the pawl and sector gear and between another of the cams in the unit and the sector gear, the connections adapted to disengage the pawl with the master wheel and engage the sector gear with the actuator gear prior to the entry period of the operation and engage the pawl with the master wheel and disengage the sector gear from the actuator gear during restoring periods of the operation as well as to drive the sector gear, and means actuated by the operation of any of the numeral keys to connect the cam unit with the power shaft.

4. In a recording and computing machine, numeral keys, a master wheel, an actuator gear in continuous driving connection with said master wheel, a sector gear permanently in the plane of rotation of said actuator gear, a pawl normally in locked engagement with said master wheel, a continuously rotating power shaft, a cam unit normally disconnected from but associated with the power shaft, connections extending respectively between one of the cams in the unit and the pawl and sector gear and between another of the cams in the unit and the sector gear, the first mentioned connections adapted to engage the pawl with the master wheel when the sector gear is disengaged from the actuator gear and to disengage the pawl from the master wheel when the sector gear is engaged with the actuator gear, and means actuated by the operation of any of the numeral keys to connect the cam unit with the power shaft.

5. In a recording and computing machine numerical keys, a totalizer for receiving entries, a master wheel, an actuator gear in continuous driving connection with said master wheel, a sector gear permanently in the plane of rotation of said actuator gear, a pawl normally in locked engagement with the said master wheel, a continuously rotating power shaft, a cam unit normally disconnected from but associated with the power shaft, connections extending respectively between one of the cams in the unit and the pawl and sector gear and between another of the cams in the unit and the sector gear, the first mentioned connections adapted to disengage the pawl from the master wheel when the sector gear is engaged with the actuator gear during the entry period of the operation and to engage the pawl with the master wheel when the sector gear is disengaged from the actuator gear during the restoring period of the operation, and means actuated by the operation of any of the numeral keys to connect the cam unit with the power shaft.

6. In a recording and computing machine, a master wheel, an actuator gear in continuous driving connection with said master wheel, a sector gear permanently in the plane of rotation of said actuator gear, a pawl normally in locked engagement with said master wheel, a continuously rotating power shaft, a cam unit normally disengaged from but associated with the power shaft, a first means connecting said pawl and said sector gear with said cam unit to effect locking and unlocking of said master wheel and engagement and disengagement of said sector gear and said actuator gear, and a second means connecting said sector gear and said cam unit to effect rotation of said sector gear, and means actuated by the operation of any of the said keys to connect the cam unit with the power shaft.

7. In a recording and computing machine, a totalizer for receiving entries, numeral keys, a master wheel, an actuator gear in continuous driving connection with said master wheel, a sector gear permanently in the plane of rotation of said actuator gear, a pawl normally in locked engagement with said master wheel, a continuously rotating power shaft, a cam unit normally disengaged but associated with the power shaft, connections extending respectively between one of the cams in the unit and the pawl and sector gear and between another of the cams in the unit and sector gear, the connections adapted to disengage the pawl from the master wheel when the sector gear is engaged with the actuator gear and vice versa as well as to drive the sector gear, and means actuated by the operation of any of the keys to connect the cam unit with the power shaft.

8. In a recording and computing machine, a totalizer for receiving entries, numeral keys, a master wheel, an actuator gear in continuous driving connection with said master wheel, a sector gear permanently in the plane of rotation of said actuator gear, said sector gear being normally out of mesh with said actuator gear, a continuously rotating power shaft, a cam unit normally disconnected from but associated with the power shaft, a first means connecting said sector gear with said cam unit to effect the engaging and disengaging of said sector gear with the actuator gear prior to the entry period of the operation and to effect the disengaging of said sector gear with the actuator gear upon completion of the entry period of the operation, and a second means connecting said sector gear and said cam unit to effect rotation of said sector gear in one direction subsequent to the engagement of said sector gear with said actuator gear and rotation of said sector gear in the opposite direction subsequent to the disengagement of said sector gear from said actuator gear, and means actuated by the operation of any of the keys to connect the cam unit with the power shaft.

9. In a recording and computing machine, a totalizer for receiving entries, numeral keys, a master wheel, an actuator gear in continuous driving connection with said master wheel, a sector gear permanently in the plane of rotation of said actuator gear, said sector gear being normally out of mesh with said actuator gear, a pawl normally in locked engagement with said master wheel, a continuously rotating power shaft, a cam unit normally disconnected from but associated with the power shaft, a first means connecting said sector gear and pawl with said cam unit to effect concomitantly the engaging of said sector with said actuator gear and the unlocking of said master wheel prior to the entry period of operation and concomitantly the disengaging of said sector gear from said actuator gear and the locking of said master wheel upon the completion of said entry period of operation, and a second means connecting said sector gear and said cam unit to effect rotation of said sector gear in one direction subsequent to the engagement of said sector gear with said actuator gear and rotation of said sector gear in the opposite direction subsequent to the disengagement of said sector gear from said actuator gear, and means actuated by the operation of any of the keys to connect the cam unit with the power shaft.

10. In a recording and computing machine, a totalizer for receiving entries, numeral keys, a master wheel, an actuator gear in continuous driving connection with said master wheel, a sector gear permanently in the plane of rotation of said actuator gear, said sector gear being normally out of mesh with said actuator gear, a pawl normally in locked engagement with said master wheel, a continuously rotating power shaft, a cam unit normally disconnected from but associated with said power shaft, means connecting said sector gear and pawl with said cam unit to effect concomitantly the engaging of said sector gear with the actuator gear and the unlocking of said master wheel prior to the entry period of operation and to effect concomitantly the disengaging of said sector gear from said actuator gear and the locking of said master wheel upon the completion of said entry period of operation, and means actuated by the operation of any of the keys to connect the cam unit with the power shaft.

11. In a recording and computing machine, a totalizer for receiving entries, numeral keys, a master wheel, an actuator gear in continuous driving connection with said master wheel, a sector gear permanently in the plane of rotation of said actuator gear, said sector gear being engageable and disengageable with said actuator gear, a pawl normally in locked engagement with said master wheel, a continuously rotating power shaft, a cam unit normally disconnected but associated with the power shaft, a first means connecting said pawl with said cam unit to effect the unlocking of said master wheel prior to the entry of operation and the locking of said master wheel upon the completion of said entry period of operation, a second means connecting said sector gear and said cam unit to effect the rotation of said sector gear in one direction subsequent to the engagement of said sector gear with said actuator gear and rotation of said sector gear in the opposite direction subsequent to the disengagement of said sector gear from said actuator gear, and means actuated by the operation of any of the keys to connect the cam unit with the power shaft.

12. In a recording and computing machine, a totalizer for receiving entries, numeral keys, a master wheel, an actuator gear in continuous driving connection with said master wheel, a sector gear permanently in the plane of rotation of said actuator gear, said sector being engageable and disengageable from said actuator gear, a continuously rotating power shaft, a cam unit normally disconnected from but associated with the power shaft, means connecting said sector gear and said cam unit to effect rotation of said sector gear in one direction subsequent to the engagement of said sector gear with said actuator gear and to effect rotation of said sector gear in the opposite direction subsequent to the disengagement from said actuator gear, and means actuated by the operation of any of the keys to connect the cam unit with the power shaft.

13. In a machine of the class described; numeral keys; a totalizer and an actuator therefore, said actuator including a master wheel, an actuator gear in continuous driving connection with said master wheel, and a sector gear permanently in the plane of rotation of said actuator gear; a continuously rotating power shaft; a cam unit normally disconnected from but associated with said power shaft; means connecting said sector gear with said cam unit for effecting planar movement of said sector gear into and out of engagement with said actuator gear; and means actuated by the operation of any of the keys to connect the cam unit with the power shaft.

14. In a machine of the class described; numeral keys; a totalizer and an actuator therefore, said actuator including a master wheel, an actuator gear in continuous driving connection with said master wheel, a sector gear permanently in the plane of rotation of said actuator gear, a pivot for said sector gear, and a support for said pivot; a continuously rotating power shaft; a cam unit normally disconnected from but associated with said power shaft; means connecting said support with said cam unit for rocking said support and said sector gear pivot to effect planar movement of said sector gear into and out of engagement with said actuator gear; and means actuated by the operation of any of the keys to connect the cam unit with the power shaft.

15. In a machine of the class described; numeral keys; a totalizer and an actuator therefore, said actuator including a master wheel, an actuator gear in continuous driving connection with said master wheel, a sector gear permanently in the plane of rotation of said actuator gear, a pivot for said sector gear, and a support for said pivot; a continuously rotating power shaft; a cam unit normally disconnected but associated with the power shaft; means connecting said support and including a pin and slot camming device for locking said support and said sector gear pivot to effect planar movement of said sector gear into and out of engagement with said actuator gear; and means actuated by the operation of any of the keys to connect the cam unit with the power shaft.

16. In a recording and computing machine, a totalizer for receiving entries, numeral keys, a control unit actuated by any of said keys, a master wheel, an actuator gear in continuous driving connection with said master wheel, a sector gear permanently in the plane of rotation of said actuator gear, and means connecting said sector gear with said control unit, said connecting means including a pivot for said sector gear, a support for said pivot, and a device under control of any one of said numeral keys for rocking said support and said sector gear pivot to effect planar movement of said sector gear into and out of engagement with said actuator gear.

EDWIN OTTO ROGGENSTEIN.

REFERENCES CITED

The following references are of record in the file of this patent:

UNITED STATES PATENTS

| Number | Name | Date |
| --- | --- | --- |
| 1,006,787 | Pratt | Oct. 24, 1911 |
| 2,380,598 | Kammel | July 31, 1945 |
| 1,347,621 | Degener | July 27, 1920 |